United States Patent [19]

Nakamura et al.

[11] Patent Number: 5,134,332

[45] Date of Patent: Jul. 28, 1992

[54] AC SPINDLE MOTOR AND METHOD OF CHANGING ROTATING SPEED OF SAME

[75] Inventors: Kosei Nakamura, Hino; Yoshiyuki Hayashi, Yamanashi; Kazuhisa Numai, Yamanashi; Masami Kimijima, Yamanashi, all of Japan

[73] Assignee: Fanuc Ltd, Yamanshi, Japan

[21] Appl. No.: 499,335

[22] PCT Filed: Nov. 29, 1989

[86] PCT No.: PCT/JP89/01204

§ 371 Date: Apr. 18, 1990

§ 102(e) Date: Apr. 18, 1990

[30] Foreign Application Priority Data

Nov. 29, 1988 [JP] Japan .................. 63-299670

[51] Int. Cl.$^5$ .................. H02K 17/14; H02P 5/28
[52] U.S. Cl. .................. 310/208; 310/68 R; 318/772
[58] Field of Search .................. 310/258, 259, 254, 208, 310/68 R, 207, 179, 180, 184, 198, 187; 318/772, 775, 777, 786, 794, 795; 29/596

[56] References Cited

U.S. PATENT DOCUMENTS

| | | | |
|---|---|---|---|
| 4,071,789 | 1/1978 | Ernster et al. | 310/50 |
| 4,486,699 | 12/1984 | Hoemann et al. | 318/772 |
| 4,737,701 | 4/1988 | Hoemann et al. | 318/772 |
| 4,757,224 | 7/1988 | McGee et al. | 310/181 |
| 4,835,839 | 6/1989 | Forbes et al. | 29/596 |
| 4,937,513 | 6/1990 | Hoemann et al. | 318/772 |
| 4,947,098 | 8/1990 | Viasak | 318/775 |

FOREIGN PATENT DOCUMENTS

Y-12-1260 2/1937 Japan .

Primary Examiner—Steven L. Stephan
Assistant Examiner—E. H. To
Attorney, Agent, or Firm—Armstrong, Nikaido, Marmelstein, Kubovcik & Murray

[57] ABSTRACT

An ac spindle motor (10) for driving a spindle motor of a machine tool provided with a rotor (14) having an output shaft (12) connected to the spindle, and a stator (16) surrounding the rotor and having a laminated core (20) serving as a yoke, and stator winding assemblies of three phases (U-phase, V-phase, W-phase). The stator winding assembly of each phase ($18u$, $18v$, $18w$) has: windings ($C_2$, $C_4$) of a first group which are energized for a rotation of the spindle in both a low-speed range not higher than a given speed, and a high-speed range above the given speed; windings ($C_1$, $C_3$) of a second group energized only for a rotation of the spindle in the low-speed range; and electrical contact means ($S_1$, $S_2$, $S_3$, $S_4$) controlled so that the windings ($C_1$, $C_2$, $C_3$, $C_4$) of the first and second groups are energized to generate a first multipolar revolving magnetic field for the rotation of the spindle in the low-speed range, and so that only the windings ($C_2$, $C_4$) of the first group are energized to generate second multipolar revolving magnetic field having magnetic poles less than those of the first multipolar revolving magnetic field for the rotation of the spindle in the high-speed range. The operating mode of the ac spindle motor is changed between a high-speed mode and a low-speed mode by changing the ampere-turn of the windings and the number of poles of the revolving magnetic field.

15 Claims, 4 Drawing Sheets

UPPER or LOWER WINDING

2-POLE CONNECTION

ONLY LOWER WINDING

AC SPINDLE MOTOR AND METHOD OF CHANGING ROTATING SPEED OF SAME

TECHNICAL FIELD

The present invention relates to an ac induction type spindle motor (hereinafter, referred to simply as "ac spindle motor") for driving the spindle unit of a machine tool, and more particularly, to an ac spindle motor capable of enhancing the flexibility of the spindle of a machine tool owing to its capability of selectively driving the spindle in a low-speed range or a high-speed range, and a method of changing the speed range of such an ac spindle motor between a low-speed range and a high-speed range.

BACKGROUND ART

A multi-phase ac spindle motor (generally, a three-phase ac spindle motor) has widely been employed for driving the spindle unit of a machine tool, i.e., the output shaft of such a multi-phase ac spindle motor has an end adapted to drive the spindle.

A multi-phase ac spindle motor of such a kind is incorporated into recent numerically controlled machine tools equipped with an automatic tool changer and machining centers, and the numerically controlled machine tools and the machining centers have advanced mechanisms for rotating the spindle at a high spindle speed. The numerically controlled machine tools and the machining centers, however, have been required to be capable of satisfactory cutting and grinding when the spindle is rotated at a spindle speed in a low-speed range as well as in a high-speed range. To meet such a requirement, the ac spindle motor must be capable of stably rotating while developing a predetermined torque in a wide speed range including a relatively low rotating speed to a relatively high rotating speed. A spindle motor for such purposes has been proposed in, for example, Japanese Patent Application No. 63-144851 filed previously by the applicant of the present application. This previously proposed spindle motor secures a stable output torque over a wide speed range by increasing or decreasing the effective number of turns of the excitation windings by changing the connection of the windings in varying the spindle speed in a wide speed range from a relatively low spindle speed to a relatively high spindle speed by varying the number of the frequency of an electric current for generating a revolving magnetic field.

A 4-pole ac induction motor has satisfactory output torque characteristics in a low-speed range, but the current control system of a driver for driving the 4-pole ac induction motor must be changed from an asynchronous current control system to a synchronous current control system for operation in a high-speed range, which requires a troublesome procedure. Accordingly, in most cases, a 2-pole ac induction motor having satisfactory output characteristics in a high-frequency range is employed. The thickness and diameter of each core plate, i.e., a core lamination, of the laminated cores of the 2-pole and 4-pole motors are determined properly so that the laminated core has desired magnetic characteristics according to the number of magnetic poles.

Accordingly, it has further been desired to provide an ac spindle motor incorporating a multi-phase ac induction motor capable of effectively utilizing the magnetic characteristics of the laminated core and output characteristics dependent on the number of magnetic poles.

In utilizing the characteristics of a laminated core of a small thickness and a small core diameter incorporated into a conventional 4-pole ac induction motor, the inherent satisfactory speed-torque characteristics of the 4-pole ac induction motor are effective in a low-speed range. In a high-speed range, however, it is difficult to increase the rotating speed of the 4-pole ac induction motor to a sufficiently high rotating speed by increasing the number of frequencies without changing the number of magnetic poles because an unlimited increase in the frequency number is difficult owing to restrictive conditions on the driver. On the other hand, since the diameter of the core yoke of a laminated core for a conventional 2-pole ac induction motor, in general, is greater than that of a laminated core for a 4-pole ac induction motor, employment of a laminated core for a conventional 2-pole ac induction motor inevitably increases the size of the ac spindle motor.

SUMMARY OF THE INVENTION

Accordingly, an object of the present invention is to provide a novel ac spindle motor incorporating a laminated core for a 4-pole ac induction motor and capable of varying the spindle speed and output power in both a low-speed and a high-speed range.

Another object of the present invention is to provide a novel method of changing the operating mode of such a novel ac spindle motor between a low-speed mode and a high-speed mode.

The present invention provides an ac spindle motor capable of changing the range of output speed between a low-speed range and a high-speed range through the change of the ampere-turn of the windings and the change of the number of magnetic poles, including:

a rotor for driving the spindle of a machine tool, and having an output shaft adapted for connection to the spindle;

a stator surrounding the rotor, said stator being provided with a laminated core serving as a yoke, and a plurality of stator winding assemblies of different phases mounted on the laminated core, for generating a revolving magnetic field; characterized in that:

the stator winding assembly of each phase for generating a revolving magnetic field comprises windings of a first group which are energized by an electric drive current for the rotation of the spindle in both a low-speed range not higher than a given rotating speed and a high-speed range above the given rotating speed; windings of a second group which are energized by an electric drive current only for the rotation of the spindle in the low-speed range; and electrical contact means for conducting a switching operation in such a manner that an electric drive current is supplied to both the windings of the first group and those of the second group to generate a first multipolar revolving magnetic field when the spindle is to be rotated at a rotating speed in the low-speed range, and that an electric drive current is supplied to only the windings of the first group to generate a second multipolar revolving magnetic field generated by magnetic poles of which the number is less than that generating said first multipolar revolving magnetic field when the spindle is to be rotated at a rotating speed in the high-speed range.

The speed range of the ac spindle motor thus constructed can be changed from the low-speed range to the high-speed range, by reducing the number of magnetic poles and reducing the number of effective windings to reduce the magnetic flux density within the laminated core regardless of the foregoing restrictions on the driver.

BRIEF DESCRIPTION OF THE DRAWINGS

The above and other objects, features and advantages of the present invention will become more apparent from the following description of the preferred embodiments of the present invention illustrated in the accompanying drawings, in which.

DETAILED DESCRIPTION OF THE PREFERRED EMBODIMENT

Figure 1A:
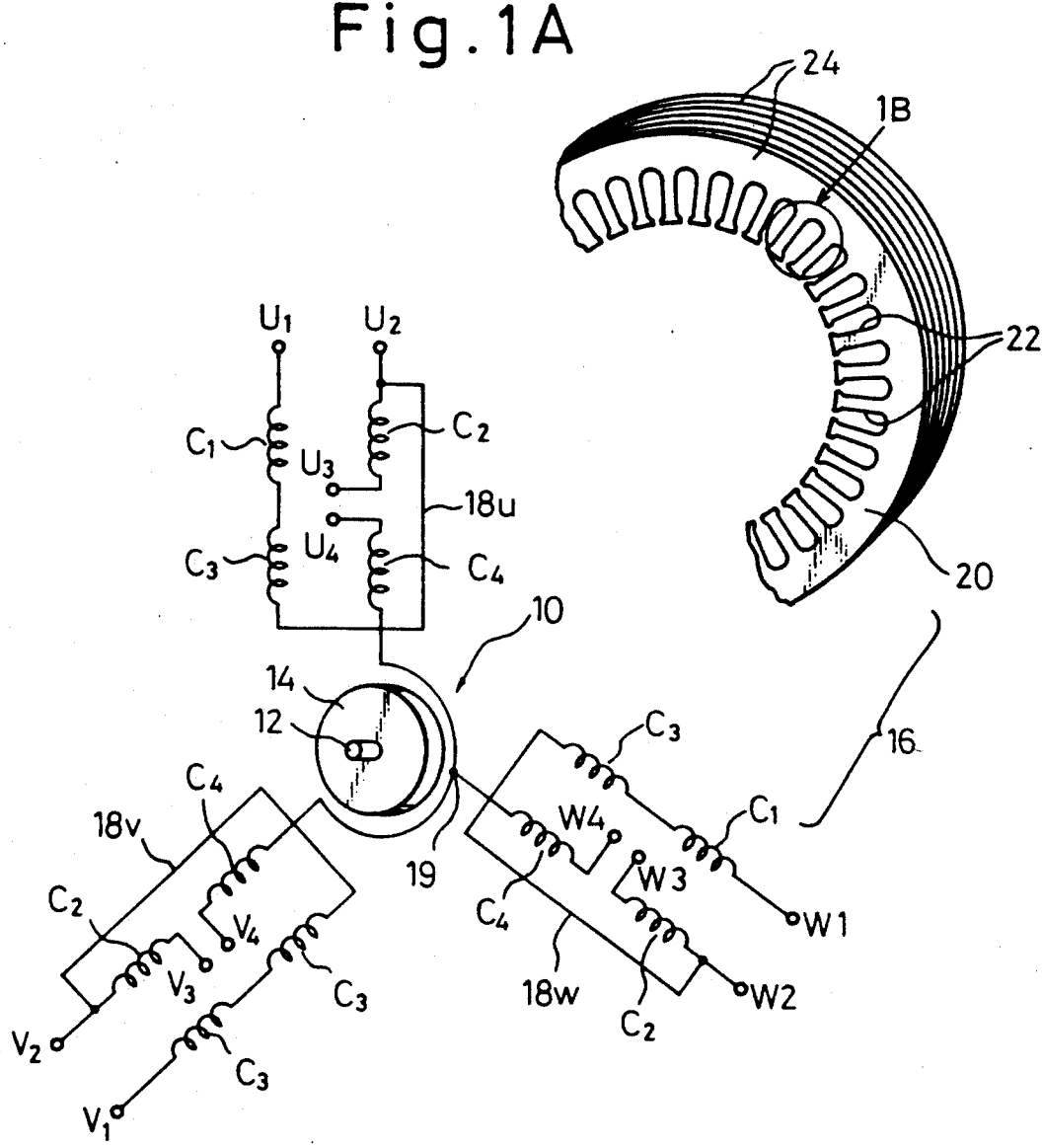
FIG. 1A is a schematic circuit diagram showing the arrangement of the windings of a variable-output three-phase ac spindle motor according to a preferred embodiment of the present invention and a fragmentary view of a laminated core.
Figure 1B:
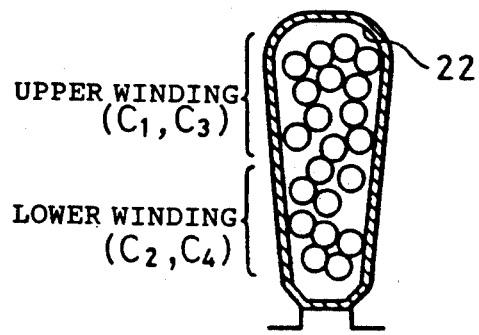
FIG. 1B is an enlarged fragmentary view of a portion indicated at 1B in FIG. 1A, showing the disposition of an upper winding and a lower winding within a slot.

Referring to FIG. 1A, a three-phase ac spindle motor 10 embodying the present invention comprises a rotor 14 provided coaxially with an output shaft 12 to be connected to the spindle of a machine tool to drive the spindle, and a three-phase stator 16. The three-phase stator 16 has a stator winding 18 capable of being changed between a conformation for generating a 2-pole revolving magnetic field and a conformation for generating a 4-pole revolving magnetic field. The stator winding 18 consists of a U-phase stator winding assembly 18u, a V-phase stator winding assembly 18v and a W-phase stator winding assembly 18w, which are connected to an electrically neutral point 19. The stator winding assemblies 18u, 18v and 18w are embedded in slots 22 formed in a laminated core 20. FIG. 1B shows the upper windings and lower windings of one of the stator winding assemblies embedded in two layers in a slot. It should be understood that the laminated core 20 shown in FIG. 1A is a yoke of a known construction for 4-pole winding, which is constructed by laminating laminations 24 having a thickness and an outside diameter smaller than those of laminations for a laminated core for 2-pole winding.

As shown in FIG. 1A, the U-phase stator winding assembly 18u, the V-phase stator winding assembly 18v and the W-phase stator winding assembly 18w are similar in construction. The U-phase stator winding assembly 18u, for example, comprises four windings $C_1$, $C_2$, $C_3$ and $C_4$, and four drive current terminals $U_1$, $U_2$, $U_3$ and $U_4$; the other winding assemblies are alike.

Figure 2:
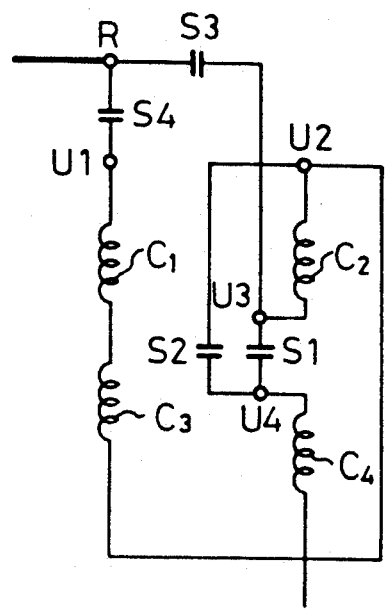
FIG. 2 is a circuit diagram of one of the stator winding assemblies of different phases of the spindle motor of FIG. 1, showing the arrangement of windings and contacts on conductors for pole changing.

FIG. 2 shows the arrangement of switching contacts S1 to S4 of a not shown conductor which is arranged to change over the U-phase stator winding assembly 18u shown in FIG. 1 between a 4-pole connection and a 2-pole connection. The conductor transmits control signals to the switching contacts S1 to S4 to open or close the same according to a low-speed mode command signal or a high-speed mode command signal provided by a controller for controlling an electric driver for driving the ac spindle motor. Since the conductors are not directly related to the substance of the present invention, the description thereof will be omitted. The four switching contacts S1 to S4 of the U-phase stator winding assembly 18u shown in FIG. 2 are provided between drive current terminals $U_3$ and $U_4$, between terminals $U_2$ and $U_4$, before a terminal $U_3$, and before a terminal $U_1$, respectively. The switching contacts S1 to S4 changes the mode of flow of an electric drive current for generating a revolving magnetic field through the windings $C_1$ to $C_4$ of the U-phase stator winding assembly 18u for pole change. It is to be noted that the V-phase stator winding assembly 18v and the W-phase stator winding assembly 18w shown in FIG. 1 are each also provided with four switching contacts S1 to S4. FIG. 2 merely shows the positional arrangement of the switching contacts S1 to S4, and hence the switching contacts S1 to S4 are, for example, in an open state.

Figure 3:
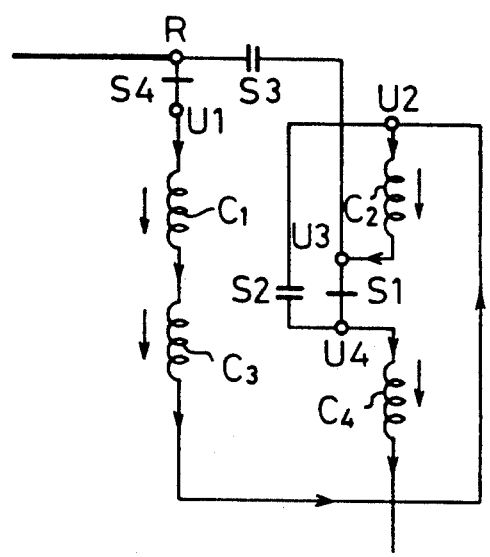
FIG. 3 is a circuit diagram corresponding to FIG. 2, showing the condition of the contacts for low-speed operation.

Referring to FIG. 3, when a low-speed mode command signal is given, a control signal is given to the conductor thereby to close the switching contacts S1 and S4 and to open the switching contacts S2 and S3. Then, a U-phase drive current supplied to the U-phase stator winding assembly 18u flows as indicated by arrows through the switching contacts S1 and S4 and all the four windings $C_1$ to $C_4$ connected in the 4-pole connection for the low-speed mode.

Figure 4:
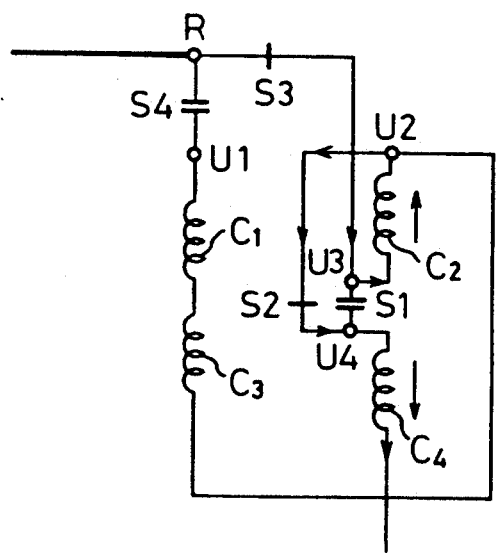
FIG. 4 is a circuit diagram corresponding to FIG. 2, showing the condition of the contacts for high-speed operation.

Referring to FIG. 4, when a high-speed mode command signal is given, the switching contacts S2 and S3 are closed and the switching contacts S1 and S4 are opened. Then, a U-phase drive current flows as indicated by arrows only through the windings $C_2$ and $C_4$ connected in the 2-pole connection for the high-speed mode.

Although the 4-pole connection and 2-pole connection of only the U-phase stator winding assembly 18u of the three-phase ac spindle motor are shown in FIGS. 3 and 4, the V-phase stator winding assembly 18v and the W-phase stator winding assembly 18w are operated likewise and V-phase drive current and W-phase drive current are supplied to the V-phase stator winding assembly 18v and the W-phase stator winding assembly 18w at a phase difference of 120° in electrical phase angle. Thus, a 4-pole revolving magnetic field or a 2-pole revolving magnetic field is generated in the stator 16.

Referring again to FIGS. 2 to 4 showing the U-phase stator winding assembly 18u by way of example, the windings $C_1$ and $C_3$ are used only for the 4-pole connection, while the windings $C_2$ and $C_4$ are used for both the 4-pole connection and the 2-pole connection. Since the 4-pole laminated core is employed, the ampere-turn is reduced to prevent the saturation of flux density in the laminated core and to develop an appropriate torque for the high-speed mode. According to the present invention, the windings $C_1$ and $C_2$ are embedded one over the other in the slot of the laminated core, and the windings $C_3$ and $C_4$ are embedded one over the other in the slot of the laminated core.

Figure 5A:
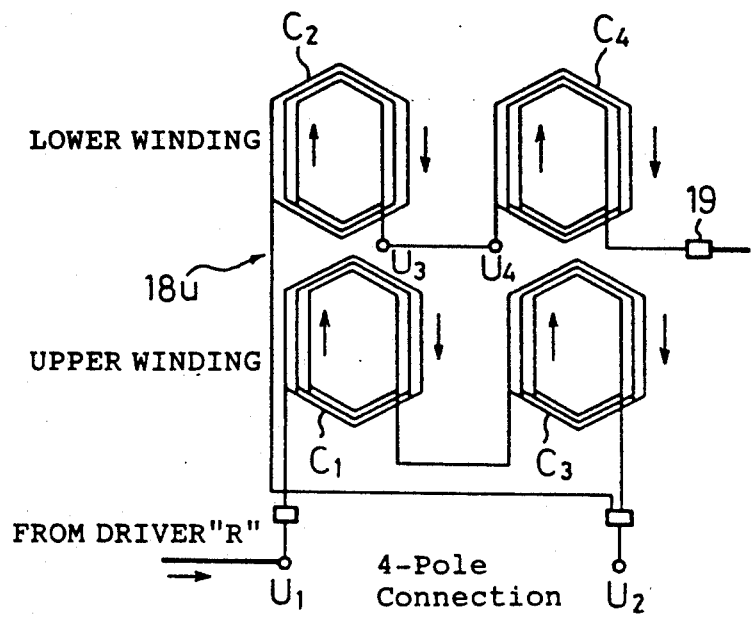
FIG. 5A is a diagram corresponding to FIG. 2, showing the 4-pole connection of the windings of one of the stator winding assemblies of different phases.
Figure 5B:
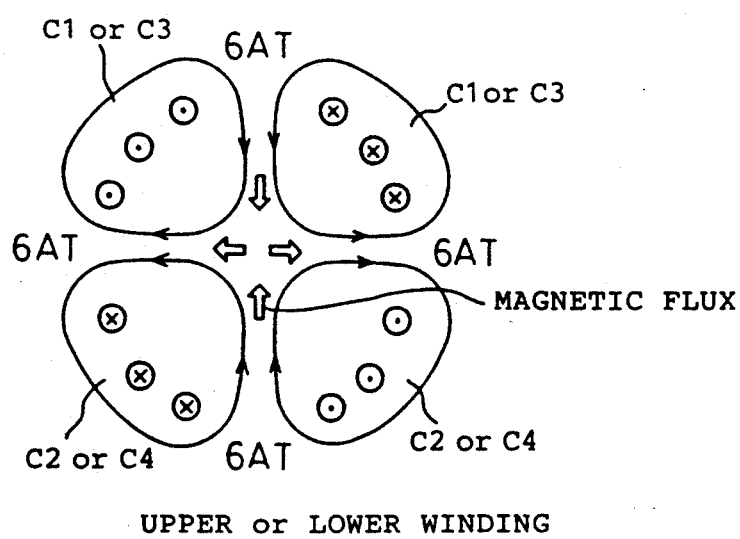
FIG. 5B is a diagram showing directions of lines of magnetic flux when an electric drive current is supplied to the windings of the stator winding assembly in a connection shown in FIG. 5A.

FIGS. 5A and 5B show the arrangement of the windings of the U-phase stator winding assembly 18u in the slot and directions of lines of magnetic flux, respectively, in the 4-pole connection, in which the number of turns of each of the windings $C_1$ to $C_4$ is six. In FIG. 5B, thick arrows indicate directions of lines of magnetic flux and the magnetomotive force of the magnetic flux in each direction is six ampere-turns.

Figure 6A:
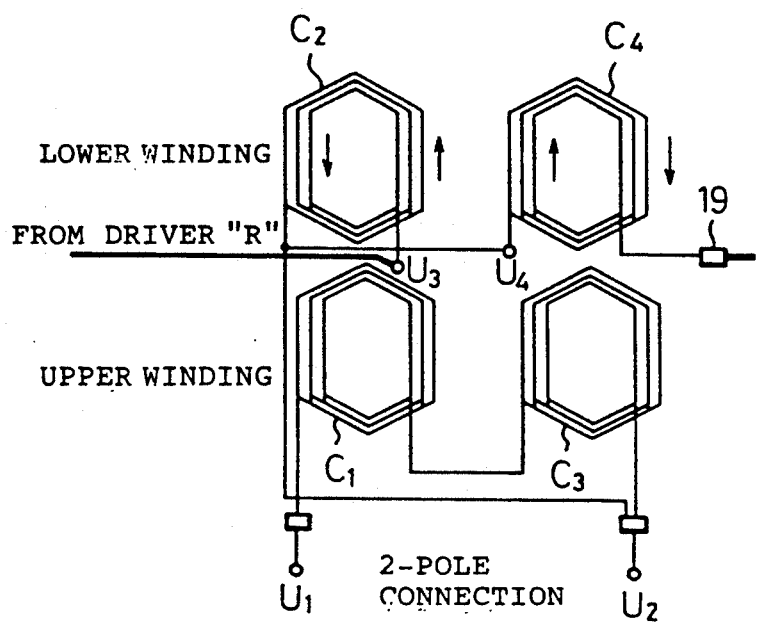
FIG. 6A is a diagram corresponding to FIG. 2, showing the 2-pole connection of the windings of one of the stator winding assemblies of different phases.
Figure 6B:
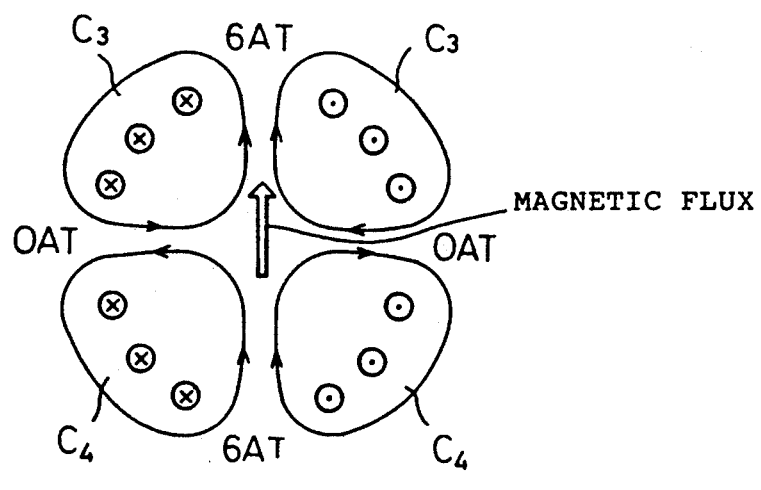
FIG. 6B is a diagram showing lines of magnetic flux when an electric drive current is supplied to the windings of the stator winding assembly of connection shown in FIG. 6A.

FIG. 6A and 6B show the arrangement of the windings of the U-phase stator winding assembly 18u in the slot and directions of lines of magnetic flux, respectively, in the 2-pole connection. The flux density in the laminated core is reduced approximately by half because the upper windings $C_1$ and $C_2$ in the slots are not used, and thus the saturation of flux density in the 4-pole laminated core can be prevented. As is obvious from the construction of the ac spindle motor embodying the present invention, the present invention employs a multipolar laminated core designed for an ac spindle motor of a relatively low rotating speed, disposes two stator windings one over the other in each slot of the laminated core, and changes its operating mode between a high-speed mode and a low-speed mode regardless of restrictions on the driver by changing the number of magnetic poles and selectively energizing the windings to prevent the saturation of flux density in the laminated core so that the ac spindle motor may operate at a desired speed in the high-speed range and may develop a desired torque.

Although the present invention has been described as applied to an ac spindle motor which changes the spindle speed by changing the connection of the stator windings between a 2-pole connection and a 4-pole connection, which is most effective for changing the range of spindle speed between a high-speed range and a low-speed range, naturally, the present invention is applicable to an ac spindle motor which changes the spindle speed by changing the connection of the stator windings in a different manner. The stator windings may be arranged in the foregoing manner on a 2-pole laminated core, but a 2-pole laminated core is larger than a corresponding 4-pole laminated core and hence employment of a 2-pole laminated core increases inevitably the size of the ac spindle motor.

As apparent from the foregoing description, the present invention provides an ac spindle motor employing a laminated core for a multipolar ac induction motor for uses requiring a relatively low rotating speed, and capable of changing its range of speed between a high-speed range or a low-speed range and developing a desired torque for the normal cutting and grinding operation of a machine tool. Since the diameter of the laminated core serving as the spindle yoke is relatively small, the ac spindle motor is compact in construction and requires a relatively small space for mounting on a machine tool. The thermal resistance of the outer casing of the ac spindle motor in liquid-cooling the ac spindle motor is small and the ac spindle motor is able to develop a high torque because the ac spindle motor employs a laminated core of a relatively small diameter. Thus, the ac spindle motor of the present invention is very effective in both performance and external shape.

We claim:

1. An ac spindle motor for driving a spindle of a machine tool, comprising:

a rotor having an output shaft adapted for connection to the spindle;

a stator arranged to surround said rotor, said stator having a laminated core serving as a yoke, and a plurality of stator winding assemblies of different phases mounted on said laminated core for generating a revolving magnetic field for causing rotation of said rotor in a low speed range not higher than a given rotation speed and in a high speed range higher than said given rotation speed; said stator having a predetermined number of magnetic poles for selectively generating one of a first multipolar revolving magnetic field having a first predetermined number of poles and a second multipolar revolving magnetic field having a second predetermined number of poles; and each of said plurality of stator winding assemblies of each phase for generating a revolving magnetic field comprising windings of a first group which are energized by an electric drive current for rotation of said spindle in both said low-speed range and said high-speed range;

windings of a second group which are energized by an electric drive current only for rotation of said spindle in said low-speed range; and electrical contact means for conducting a switching operation in such a manner that said electric drive current is supplied to both said windings of said first and second groups to generate a first multipolar revolving magnetic field when said spindle is to be rotated at a rotating speed in said low-speed range, and that said drive current is supplied to only said windings of said first group to generate a second multipolar revolving magnetic field generated by magnetic poles of which the number is less than that of the predetermined number of magnetic poles generating said first multipolar revolving magnetic field when said spindle is to be rotated at a rotating speed in said high-speed range.

2. An ac spindle motor according to claim 1, wherein the windings of the first and second groups of the stator winding assembly of said each phase are, respectively, connected in series, and said windings of said first and second groups of the stator winding assembly of said each phase are of a given ampere-turn.

3. An ac spindle motor according to claim 2, wherein said laminated core comprises laminations of magnetic steel adopted for generating a 4-pole revolving magnetic field, said plurality of stator winding assemblies are arranged in a three-phase connections, the windings of the first group include windings for the first magnetic pole and for the second magnetic pole, and the windings of the second group include windings for the third magnetic pole and the fourth magnetic pole.

4. An ac spindle motor according to claim 2, wherein the windings of the first and the second groups of the stator winding assembly of said each phase are embedded one over the other in slots formed in said 4-pole laminated core.

5. An ac spindle motor according to claim 2, wherein said electrical contact means comprises first electrical contacts which are closed to connect said windings of said first and second groups of said stator winding assembly of said each phase in series when said low-speed range is selected, and are opened when said high-speed range is selected, and second electrical contacts which are closed only when said high-speed range is selected to energize said windings of said first group.

6. A method for changing a rotating speed of an ac spindle motor for driving the spindle of a machine tool, wherein the ac spindle motor comprises a rotor having an output shaft and a stator for creating a revolving magnetic field surrounding the rotor, comprising the steps of:

provinding said stator with a laminated stator core by laminating a plurality of lamination layers;

providing a plurality of stator winding assemblies of different phases and mounting said plurality of stator winding assemblies on said stator core, such that a stator winding assembly of each phase comprises windings of a first group and a second group, said first group of windings having a plurality of ampere-turns which are energized for the rotation of the spindle in both a high-speed range and a low-speed range, and which are not energized for the rotation of the spindle in the low-speed range, and are not energized for the rotation of the spindle in the high-speed range;

for rotation of said spindle in said low speed range, supplying an electric drive current to both said first and second groups of windings for causing rotation of said spindle in said low-speed range;

for rotation of said spindle in said high speed range, discontinuing the supplying of said electric drive current to the windings of said second group; whereby the number of active ampere-turns is changed when changing said speed range from said low-speed range to said high-speed range, and from said high-speed range to said low-speed range.

7. A method of changing the rotating speed of an ac spindle motor according to claim 6, wherein in said step of providing a plurality of stator winding assemblies of different phases, providing that the windings of said first group generate a first plurality of magnetic poles, those of said second group generate a second plurality of magnetic poles, and the number of magnetic poles is changed when changing said speed range from said low-speed range to said high-speed range and from said high-speed range to said low-speed range.

8. An ac spindle motor according to claim 5, wherein said windings of said second group comprise first and second windings separated by one of said first electrical contacts.

9. An ac spindle motor according to claim 8, wherein when said low-speed range is selected, current flows through said first winding in a first predetermined direction, and current flows through said second winding in a first chosen direction.

10. An ac spindle motor according to claim 9, wherein when said high-speed range is selected, current flows through said first winding in a second direction which is opposite to said first predetermined direction, and current flows through said second winding in said first chosen direction.

11. An ac spindle motor according to claim 2, wherein said windings of said first group comprise a pair of windings arranged in series; wherein said windings of said second group comprise a first winding and a second winding; and wherein said electrical contact means comprises a first switch disposed between said first winding and said second winding of said second group, a second switch arranged in parallel with an electrical path which includes said first switch and said first winding of said second group, a third switch arranged between a current source and said first switch, and a fourth switch arranged between said current source and said windings of said first group.

12. An ac spindle motor according to claim 11, wherein when said low-speed range is selected, said first switch and said fourth switch are closed, and said second switch and said third switch are open.

13. An ac spindle motor according to claim 12, wherein when said high-speed range is selected, said first switch and said fourth switch are open, and said second switch and said third switch are closed.

14. An ac spindle motor according to claim 11, wherein when said high-speed range is selected, said first switch and said fourth switch are open, and said second switch and said third switch are closed.

15. An ac spindle motor according to claim 14, wherein when said low-speed range is selected, electrical current flows through said first winding of said second group in a predetermined direction and through said second winding of said second group in a chosen direction, and when said high-speed range is selected, electrical current flows through said first winding of said second group in a direction which is opposite to said first predetermined direction and through said second winding of said second group in said chosen direction.

* * * * *

UNITED STATES PATENT AND TRADEMARK OFFICE
CERTIFICATE OF CORRECTION

PATENT NO. : 5,134,332

DATED : July 28, 1992

INVENTOR(S) : NAKAMURA et al

It is certified that error appears in the above-identified patent and that said Letters Patent is hereby corrected as shown below:

On the title page, Item [86], lines 2 and 3 "April 18, 1990" should read --July 18, 1990--.

Signed and Sealed this

Twenty-fourth Day of August, 1993

Attest:

BRUCE LEHMAN

Attesting Officer

Commissioner of Patents and Trademarks